June 20, 1961 J. GRUNFELDER 2,989,273
OUTFIT FOR EMPLANING AND SERVICING LIGHT HELICOPTERS
Filed Oct. 7, 1957 7 Sheets-Sheet 1

Fig. 3.

June 20, 1961 J. GRUNFELDER 2,989,273
OUTFIT FOR EMPLANING AND SERVICING LIGHT HELICOPTERS
Filed Oct. 7, 1957 7 Sheets-Sheet 6

Fig. 11

United States Patent Office 2,989,273
Patented June 20, 1961

2,989,273
OUTFIT FOR EMPLANING AND SERVICING
LIGHT HELICOPTERS
Jean Grunfelder, Paris, France, assignor to Sud-Aviation
Société Nationale de Constructions Aéronautiques,
Paris, France
Filed Oct. 7, 1957, Ser. No. 688,760
Claims priority, application France Oct. 17, 1956
14 Claims. (Cl. 244—118)

The present invention is concerned with means for enabling light helicopters to be loaded on aircraft of the cargo or freighter type.

The increasing number of missions committed to light helicopters have led to considerable development in the equipments or materials for improving the efficiency of these apparatus and widening the field of their possible applications. Thus, it has proved advantageous in certain cases to transport the light helicopter by cargo aircraft from one point to another. However, if this transport is to be beneficial the helicopter emplaning operation must be effected in a minimum time. Now as a rule light helicopters have nevertheless relatively considerable over-all dimensions, especially in height and width, these dimensions being generally greater than those of the hold and/or entrance of the aircraft.

Now it is the essential object of the present invention to provide means affording a rapid emplaning of a light helicopter on board a cargo aircraft, this emplaning operation being facilitated by the use of a handling outfit specially adapted to the various helicopter elements to be disassembled and removed from the helicopter in order to protect them and facilitates their displacement during the emplaning operation proper. Moreover, also for the purpose of saving time, the outfit forming the subject-matter of this invention can be transported by the helicopter itself, so that the latter may travel independently to the place where it is to be hauled or hoisted on board a cargo aircraft with the outfit readily available for starting immediately the dismantling and emplaning operations, without resorting to any other equipment or service apparatus available on an airfield. On the other hand, when the cargo aircraft has reached its destination this outfit transported with the helicopter is readily available for landing or discharging the latter, the detachable elements of the helicopter being preferably designed with a view to simplifying and reducing any adjustment operations when reassembling the detachable elements.

The emplaning and servicing outfit for light helicopters according to the present invention is characterized by the fact that it comprises an equipment for disassembling and reassembling certain component elements of the helicopter, devices for holding, protecting and handling these disassembled elements during the emplaning operation into a cargo aircraft, and members readily adaptable on the helicopter for enabling the latter to transport said equipment and devices during its proper flight, without resorting to other means. Of course, this outfit is completed by the conventional tool kit of the helicopter mechanic.

Other features of this invention will appear as the following description proceeds with reference to the accompanying drawings forming part of this specification and illustrating diagrammatically by way of example a typical embodiment of the invention. In the drawings.

Figures 1, 2:
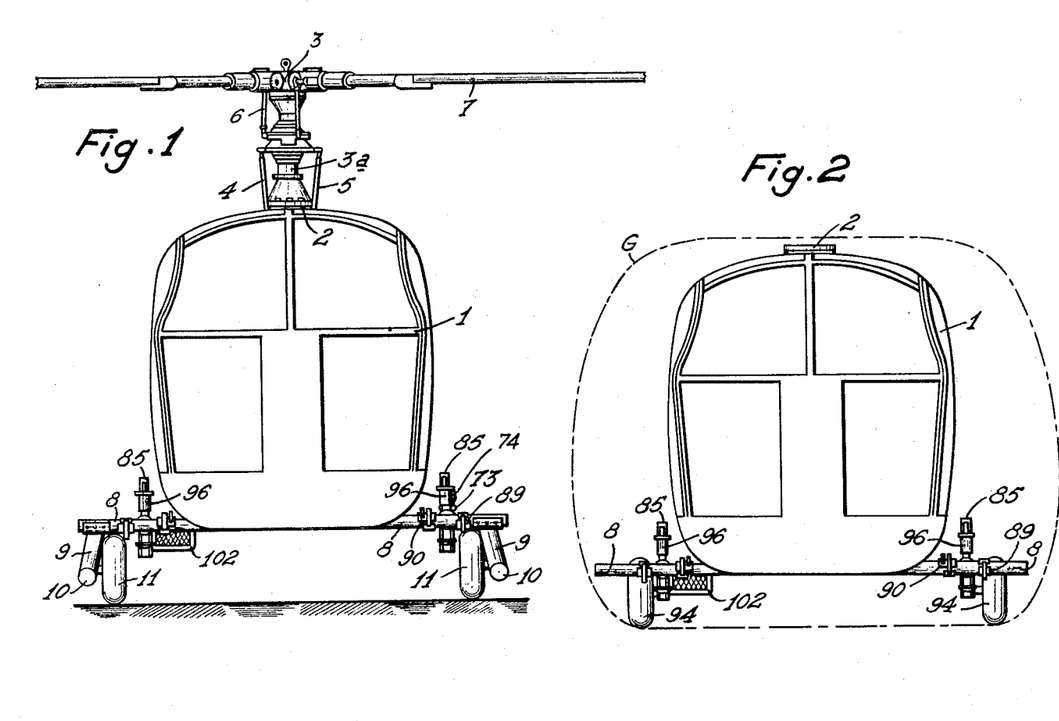
FIGURE 1 is a front view showing a light helicopter having a landing gear of the retractable wheel and skid type and carrying the disassembling equipment together with the holding, protecting and handling devices for emplaning the helicopter.
FIGURE 2 is a similar view showing the same helicopter as the latter is being hauled inside the aircraft fuselage after the rotor blades, pitch control links, hub, rotor shaft, landing skids and wheels have been dismantled and after equipping the detachable longitudinal beams with wheels.

As illustrated in FIG. 1, the light helicopter to be embarked on a cargo aircraft comprises a cabin-forming fuselage 1 above which emerges the transmission gear 2, the rotor hub 3 and the rotor shaft 3a equipped with links 4, 5 for controlling the cyclic pitch control plate, and links 6 controlling the blade pitch; the blades 7 are normally supported and driven by the hub 3. Beneath the cabin are secured a pair of cross members 8 projecting laterally therefrom and supporting near their ends pairs of legs 9 on which landing skids 10 are secured. These landing skids carry by means of supports 10a (FIG. 3) retractable wheels 11 for landing and taxiing purposes. The thus obtained landing gear is of the same type as disclosed in the U.S. Patent No. 2,641,423. Further the helicopter is provided with a conventional tail, not shown.

If the helicopter illustrated in FIG. 1 is compared with the gage available at the entrance of the cargo aircraft shown at G in FIG. 2 it is evident that this helicopter projects from the limits of this gage on the one hand with its members 3 to 7 overlying the cabin 1 and on the other hand with its landing skids 10.

Therefore, to permit the loading of the helicopter in the cargo aircraft the upper structural elements 3 to 7 and the skids 10 must be dismantled, and this obviously makes it necessary to remove the retractable wheels 11.

Figure 3:
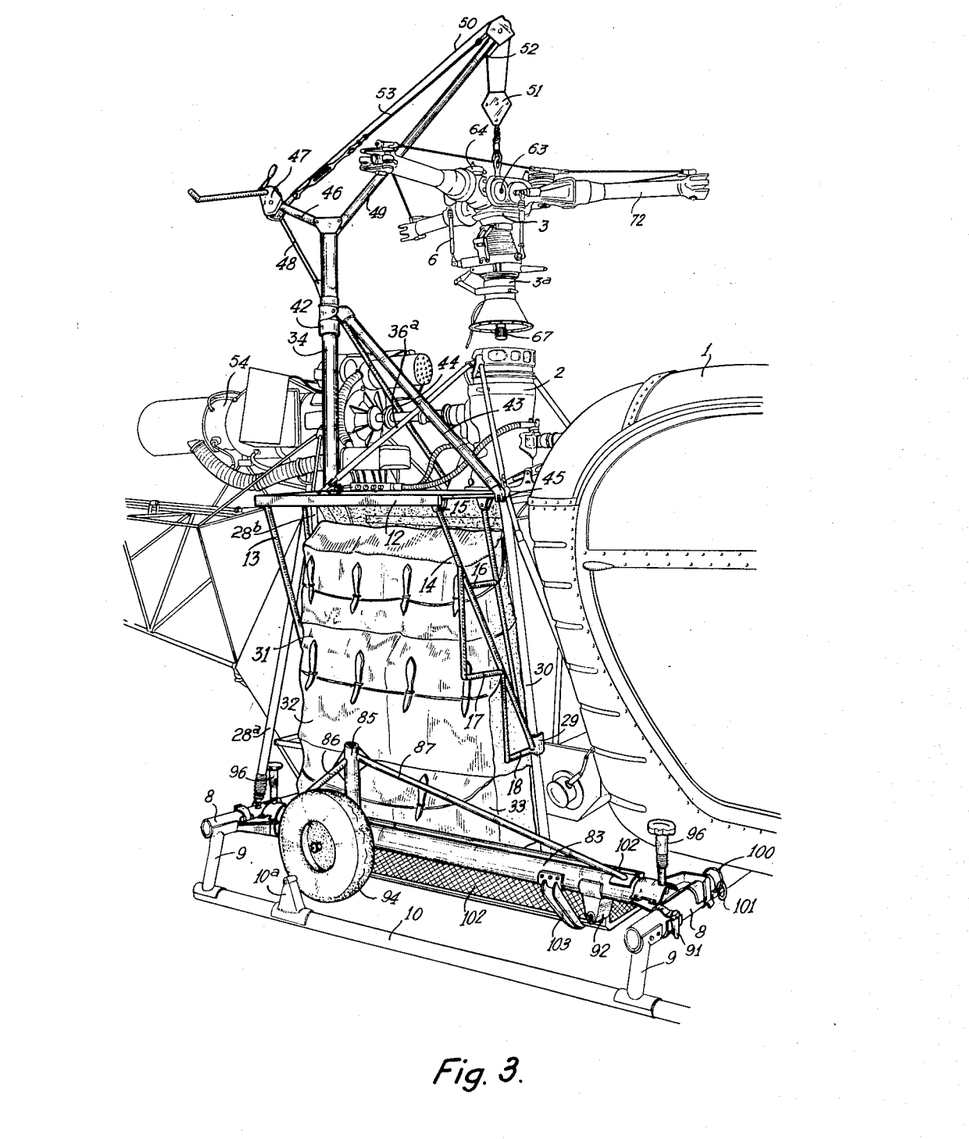
FIGURE 3 is a perspective view showing the disassembling equipment erected on the offside of the helicopter and illustrated during the dismantling of the rotor hub from the transmission gear, the retractable wheels of the skid-type landing gear being removed after the detachable longitudinal beams have been equipped with wheels, the assembly bearing through the skids on the ground.
Figures 4, 9:
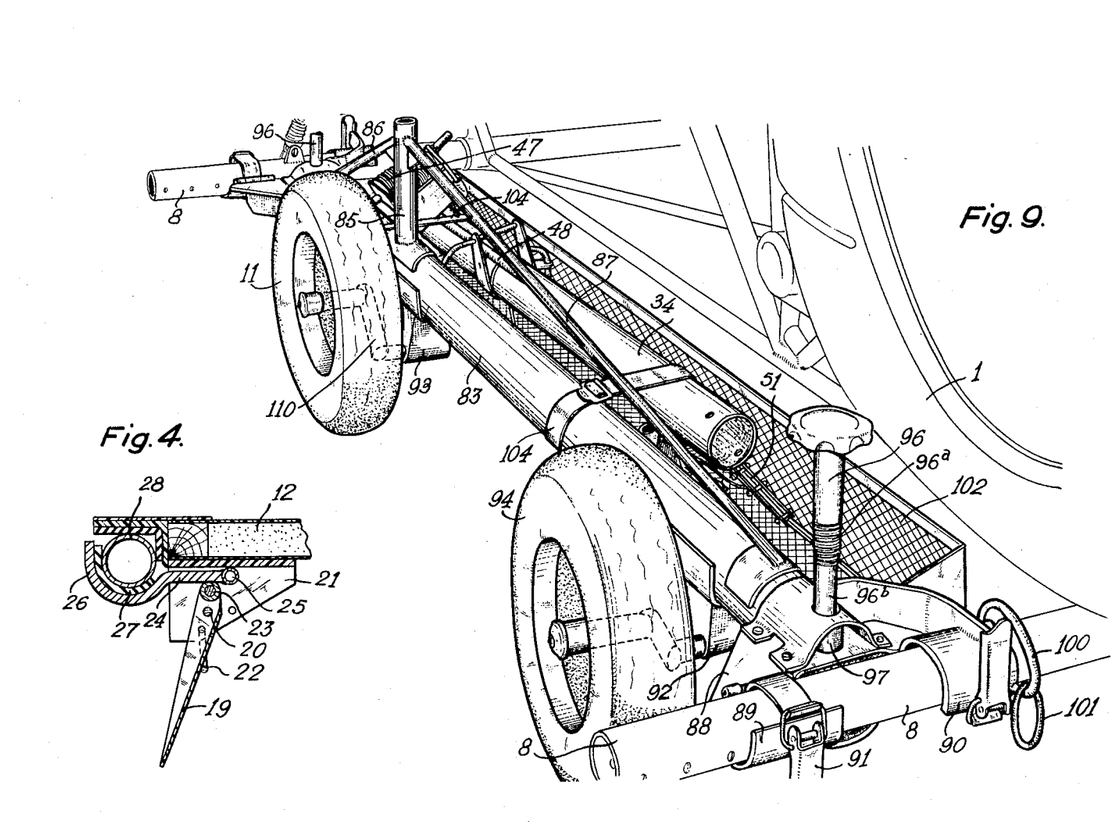
FIGURE 4 shows in cross section one of the elements for anchoring the working bridge of the disassembling equipment on the frame structure of the helicopter.
FIGURE 9 is a perspective view showing the detachable longitudinal beam on the offside of the helicopter, this beam being equipped with wheels and carrying the basket in which the folded hoisting crane is housed, the skids being removed.
Figures 5, 10:
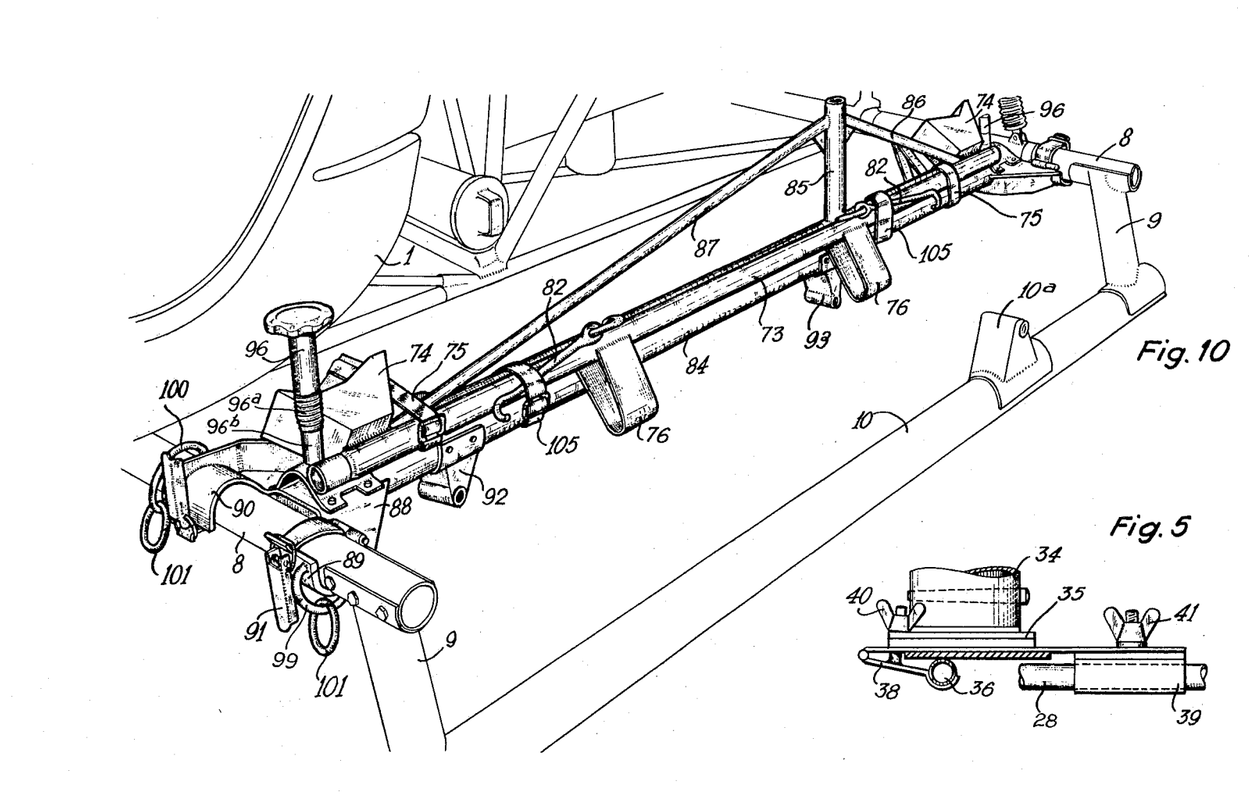
FIGURE 5 illustrates in cross section the elements for anchoring the hoisting crane of the disassembling equipment on the helicopter structure.
FIGURE 10 is a perspective view showing the detachable longitudinal beam on the near-side of the helicopter, this beam supporting the rotor hub coupling bar, the helicopter bearing on the ground through its skids after the removal of the retractable wheels.

The first disassembling work—removing the upper elements of the helicopter—is effected by utilizing the equipment illustrated in FIGS. 3 to 5. This equipment comprises a working bridge 12 consisting of a floor element of very light construction, preferably of plastic material, and a pair of tubular supporting struts 13, 14 having their upper ends pivoted in yokes 15 mounted beneath the bridge. The tubular strut 14 is provided with cross-stays 16, 17, 18 constituting a three-rung ladder.

Figure 11:
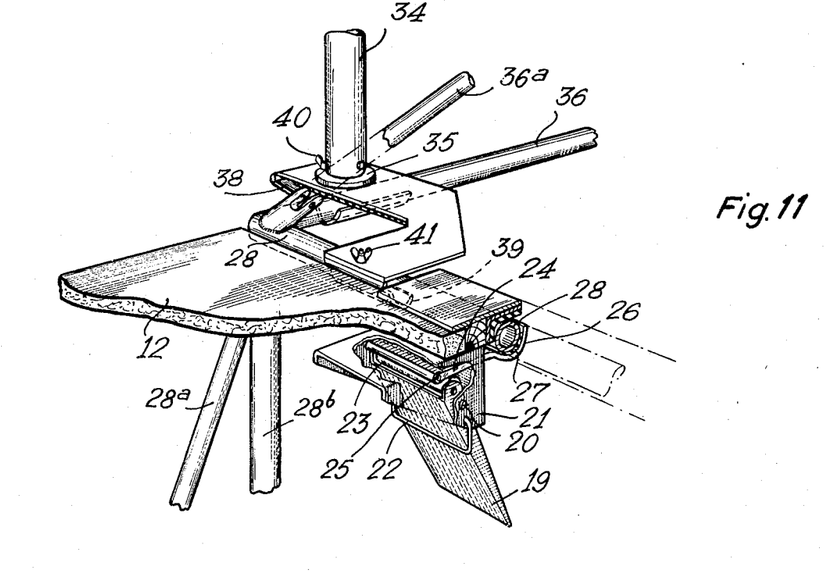
FIGURE 11 is a perspective view showing, partly broken away, the working bridge with the elements for anchoring said bridge on the helicopter structure and the elements for anchoring the hoisting crane on said structure.

This working bridge can be mounted on either side of the helicopter and secured on the tubular elements of the frame structure of the helicopter comprising tubes 28, 36, 28a, 28b and 36a with the assistance of knee-action fasteners which, as shown in FIGS. 4 and 11, comprise each a lever 19 fulcrumed at 20 on a lug 21 secured beneath the bridge 12 against the resistance of a hairpin spring 22. At its upper end this lever 19 carriers a roller 23 engaging the underface of an arm 24 pivoted at 25 on the same lug 21 and formed with a semi-circular hook-shaped head 26 lined with a pad of resilient protective material 27 such as natural or synthetic rubber. This arm 24 straddles with its semi-circular portion 26 the structural tube 28 of the helicopter to which it is secured. Each tubular strut 13, 14 has its lower end solid with a substantially U-shaped member 29 (FIG. 3) through which this strut bears against a tubular frame element of the helicopter, for example the tube 30 in the example illustrated. The bridge 12 is coated with non-skid paint and permits an easy access to the mechanical units and their accessories in view of any regular checking and replacement work to be effected thereon.

Secured on the off- and/or near-side of the structural tubes of the fuselage is a cloth bag divided into several compartments 31, 32, 33 for a purpose to be defined hereafter. The bridge with its folded angle braces can easily be housed in one of the bag compartments.

To permit the disassembling of the mechanical units and notably of the rotor hub 3 and rotor shaft 3a in order to permit the emplaning of the helicopter in a cargo aircraft, the bridge 12 has associated therewith a detachable hoisting crane. This crane comprises a king post or mast 34 equipped with a footstep bearing 35 (FIGS. 5 and 11) adapted to be secured on a pair of converging structural tubes 36, 28 of the helicopter frame with the assistance of a pair of clamps 38, 39 anchored thereon by means of nuts 40, 41. The crane mast carries a support 42 having pivoted thereon a longitudinal angle brace 43 and a transverse angle brace 44 adapted to be anchored on the helicopter frame structure by means of pivot pins such as 45.

The crane mast 34 comprises a lateral arm 46 on which a hand winch 47 is mounted and supported by an angle brace 48. On the other hand, pivoted on the top of the mast 34 is a jib 49 carrying a pulley (not visible in the drawings) over which passes a rope 50 wound on the winch 47 and co-acting with a moving block 51, the outer end of the rope being anchored on the jib at 52. The position of the jib proper is adjustable by means of a derricking device 53. Thus, it is possible by using the block 51 to hoist any desired mechanical part disposed above the helicopter structure, for example the rotor hub 3 and the rotor shaft 3a carrying the blade supporting arms 72 and the pitch control links 6, the transmission gear 2 (after having removed the rotor hub), and finally the power unit 54, in this case a turbojet engine.

The movable hoisting crane described hereabove can be easily dismantled, folded and disposed so as to have the minimum over-all dimensions. To this end, the transverse angle brace 44 when disassembled from the support 42 can fit in the longitudinal angle brace 43 and this assembly can fit in turn in the crane mast 34. The upper angle brace 48 is disconnected from the winch 47 and collapsed against the crane mast 34, as well as said winch 47 with its arm 46 and jib 49, after the derricking device 53 has been disconnected from the winch 47, said derricking device being collapsible along the jib 49. Then the assembly can be transported by the helicopter as will be made clear presently.

Figures 6, 7, 8:
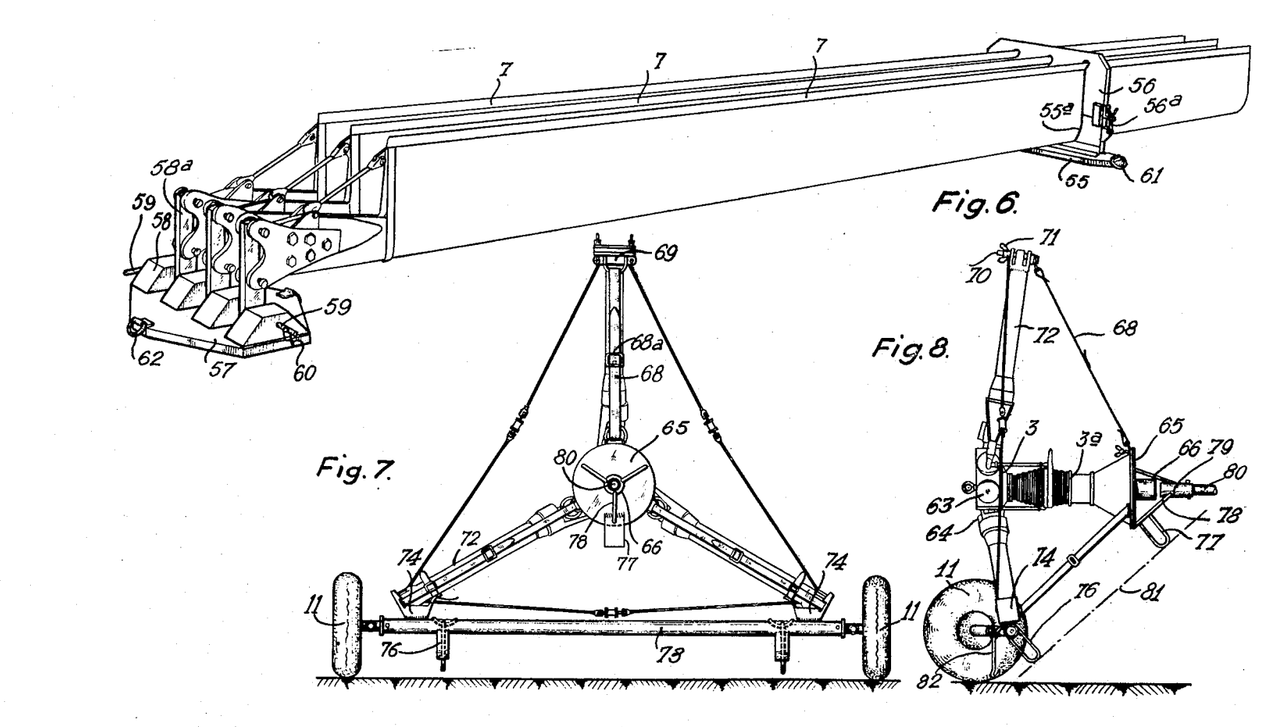
FIGURE 6 is a perspective view showing the helicopter rotor blades dismantled and mounted in two supports specially provided for this purpose.
FIGURE 7 is a front view showing the rotor hub dismantled and associated with its fastening straps and its holding coupling bar carrying in turn the wheels removed from the helicopter landing gear.
FIGURE 8 is a side view showing the device of FIG. 7 with the left-hand wheel of this figure removed to show more parts of the assembly.

Before hoisting the rotor hub 3 as shown in FIG. 3, the blades 7 are removed therefrom. These blades, as shown in FIG. 6, are grouped by using a support 55 provided with slots 55a having the contour of the leading edge of the blades with felt linings, the slot-engaging blades being held in position by a comb-like member 56 secured by wing nuts 56a, another support 57 provided with spacer blocks 58 receiving the bars 58a supporting the roots of the blades which are assembled by a spindle 59 held against longitudinal movement by a spring pin 60. The supports 55 and 57 may be constructed from any suitable material, preferably wood, and provided with rings 61, 62 for anchoring them in the cargo aircraft. They are kept inside the fuselage of the helicopter or inside the cloth bag when not in use.

After having removed the rotor hub (this assembly being collapsible by construction due to the provision of the hinged connections 63, 64—see FIG. 8—of the blade supporting arms on the hub 3 proper and of these arms on their axes), it is necessary to provide some apparatus for stiffening and handling this hub. This assembly illustrated in FIGS. 7 and 8 comprises a closing and protective cover plate 65 adapted to fit on the lower portion of the rotor shaft and formed with a projecting housing 66 adapted to receive and protect the driving pinion 67 (FIG. 3) of the rotor shaft. This cover plate carries on the other hand three straps 68 adapted to be secured on the outer ends of the blade supporting arms by means of brackets 69 and bolts 70 provided with wing nuts 71. The straps 68 are adjustable by means of their buckles 68a and clamped to press the blade supporting arms 72 against supports carried in a known way by the rotor hub 3 for holding up the blade supporting arms 72 when the rotor is at rest. Thus, the resulting assembly is relatively stiff and can be easily handled.

To ensure the maximum rigidity of this assembly a tubular coupling bar 73 is used which is formed at its ends with sockets 74 for receiving the ends of two blade-supporting arms. These ends of the blade-supporting arms are retained in said sockets by the tension of the straps 75. Thus, a stiff triangular structure is obtained which bears on the ground through a pair of legs 76 welded on the coupling bar 73 and another leg 77 solid with the closing and protective cover plate 65 through the medium of a tubular pyramid 78 carrying at its vertex a socket 79 in which a steering-pole forming handling tube 80 is fitted.

The assembly thus obtained can easily be handled by mounting endwise of the tubular coupling bar 73 the wheels 11 previously removed from the helicopter landing gear. Thus, the complete assembly can be hauled up the ramps and placed inside the cargo aircraft in which this assembly bears on the floor 81 (in chain-dotted line in FIG. 8) by means of the legs 76 and 77. Anchoring means for example in the form of hooks 82 may be provided on the bar 73 for safely holding this assembly against movement in the cargo aircraft. The weels 11 are removed to be used as explained presently.

When the skids project from the limits of the gage at the entrance of the aircraft into which the helicopter is to be emplaned, in order to permit both the disassembling of the skids from the landing gear and the handling of the skid-free helicopter to run same on the loading ramps of the cargo aircraft, the devices illustrated in FIGS. 9 and 10 are provided. These devices comprise an off-side detachable longitudinal beam 83 and a near-side detachable longitudinal beam 84. Said beams are detachable since when the helicopter is to be used for missions which do not necessitate an emplaning operation the emplaning and servicing outfit can be unloaded from the helicopter during such missions. Each longitudinal beam 83, 84 is reinforced by an upright 85 associated with two tie rods 86, 87. Each end of the longitudinal beams 83, 84 is secured on the corresponding cross-member 8 of the landing gear by means of fork-like members 88 having two opposite prongs 89, 90 permitting a quickly-detachable fixation by means of quick-release knee-action fasteners 91. Each longitudinal beam 83, 84 carries two brackets, that is, 92 at the front and 93 at the rear, adapted to receive two additional wheels 94. Rear brackets 93 are located in a common vertical plane passing through the wheel supports 10a. These wheels 94 are mounted on cranked axles 110 adapted to be angularly locked in a plurality of positions by any known means.

Thus, by mounting the two additional wheels 94 in the rear brackets 93, it is possible to lift the complete aircraft without resorting to any other service equipment, remove the wheels 11 from the landing skids, disassemble the skids 10 and their mounting legs 9 from the cross-members 8, so that the assembly will finally bear on the wheels 94 alone owing to the position of brackets 93 with respect to supports 10a. Alternatively, in case the helicopter were too long and embarked after having dismantled its tail, it is possible to support it through the wheels 94 mounted on the front brackets 92 and on the wheels 11 mounted on the rear brackets 93, as shown in FIG. 9, after having utilized these wheels for loading the rotor hub on the cargo aircraft. By adjusting the cranked axles in their end positions the over-all height of the helicopter can be reduced to a minimum to permit its introduction in the cargo aircraft as illustrated in FIG. 2.

Figure 12:
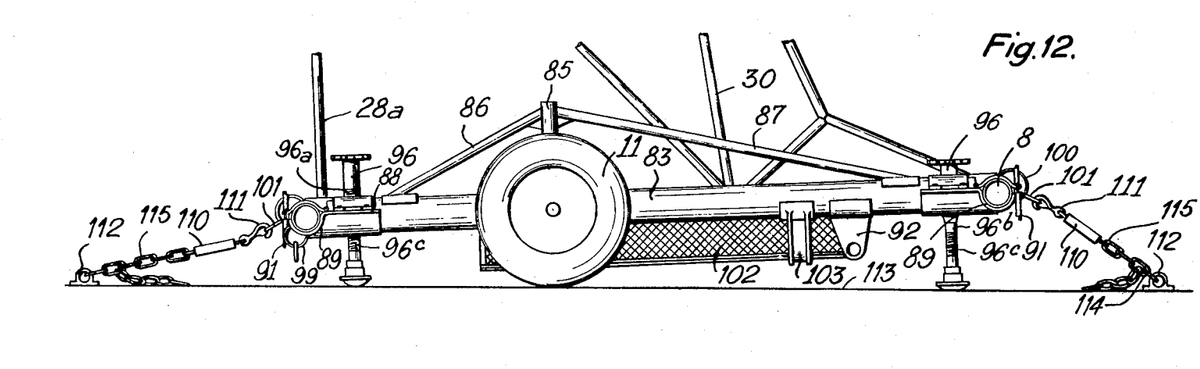
FIGURE 12 is a lateral view of the helicopter landing gear when mounted on a cargo aircraft with the elements for anchoring said landing gear on the aircraft floor.

Each longitudinal beam 83, 84 is equipped at either end with a screwjack comprising a screw 96 having two screw-threaded portions. The lower screw-threaded portion 96c (FIG. 12) engages an internally screw-threaded member 97 (FIG. 9) secured on the longitudinal beam when the assembly rests on the wheels. The upper screw-threaded portion 96a separated from the lower screw-threaded portion of same diameter by a portion 96b having a smaller diameter engages said internally screw-threaded member 97 to cause the screwjack to bear on the floor of the cargo aircraft in order to unload the wheels and tighten the anchoring devices (FIG. 12). These consist of tighteners 110, preferably of the screw type, connected at one end to a quick-release fastening device 111 permitting their fixation on rings 101, and at the other end to a chain 115 adapted to be locked on rings 112 secured on the aircraft floor 13 by using an S-shaped hook 114. The prongs of the fork members 88 are provided with fittings 99, 100 in which rings 101 are mounted to permit the haulage of the assembly.

The landing skids 10 with their legs 9 are anchored through any known and adequate means to the hold of the cargo aircraft.

In order to permit the transport of the dismantling equipment and of the holding, protecting and handling devices on the helicopter proper, the longitudinal beams 83, 84 are utilized. To this end the off-side longitudinal beam 83 is equipped with a longitudinal basket 102 secured thereon by means of fittings 103 (FIG. 3), to facilitate the transport under flying conditions of the folded hoisting crane which is held in this basket by means of straps 104, the near-side longitudinal beam 84 carrying the coupling bar 73 and the tube 80 for handling the rotor hub; this bar and said tube are secured on the longitudinal beam 84 by means of straps 105. The tube 80 is hidden by beam 84 in FIG. 10. The bag formed with a plurality of compartments 31 to 33 is adapted to receive all the other requisite parts such as the footstep bearing of the hoisting crane, the closing and protective plate, as well as the folded working bridge. The additional wheels 94 are housed in the cabin of the helicopter.

Thus, the helicopter may be flown independently to its place of emplaning by transporting all the outfits necessary for disassembling members exceeding the transverse dimensions of the entrance gage of the cargo aircraft, the holding of these disassembled members, and their protection and handling during the emplaning operation, so that this operation can be effected immediately without resorting to the servicing equipment of the airfield, and, on the other hand, when the cargo aircraft has landed, for unloading the helicopter from the aircraft, handling and reassembling the previously disassembled members of the helicopter.

It may be emphasized that the various devices required for the emplaning operation may be utilized separately or in combination for servicing operations, such as daily or routine checking and maintainance works performed on the mechanical assemblies and on the power unit, by using the working bridge, as well as the replacement of these assemblies and power unit, such as the turbojet engine illustrated by way of example in the drawings, by means of the detachable hand-actuated hoisting crane, not to mention the replacement of the landing gear skids by means of the two additional semiaxles provided with wheels.

Of course, many modifications and alterations may be brought to the specific embodiment shown and described herein within departing from the scope of the invention as set forth in the appended claims.

What I claim is:

1. An outfit for emplaning into an aircraft a light helicopter of the type having a cabin-forming fuselage above which emerge the rotor shaft and the rotor hub carrying blade-supporting arms equipped with detachable blades and, beneath said fuselage, a landing gear having detachable landing skids carrying retractable and detachable wheels, when one at least of the rotor shaft and hub and landing skids projects from the limits of the gage available at the entrance of said aircraft and for simultaneously servicing said helicopter, comprising, in combination, an equipment mountable on the helicopter for disassembling and reassembling whenever required the rotor shaft and hub after the blades have been disassembled, means mountable on the helicopter for disassembling and reassembling whenever required the landing skids after the retractable wheels have been disassembled and for simultaneously handling and anchoring the thus skid-free helicopter in an aircraft the entrance of which has a width less than the distance between the skids equipped with the wheels, devices for supporting and anchoring the disassembled blades in the aircraft, devices for simultaneously holding, protecting, handling and anchoring in said aircraft the disassembled rotor shaft and hub, and members readily adaptable on the helicopter for enabling the latter to transport said equipment and devices during its proper flight.

2. Outfit, according to claim 1, wherein the means for disassembling and reassembling the landing skids after the retractable wheels have been disassembled and for simultaneously handling and anchoring the thus skid-free helicopter in an aircraft comprise a pair of longitudinal bears adapted to be dismantled and adjustable in position on the frame of the helicopter landing gear, each one of said longitudinal beams being adapted to be equipped with at least one wheel, whereby in the case the helicopter must be emplaned into a cargo aircraft the entrance of which has a width less than the distance between the skids equipped with the wheels it is possible to reconstitute, after the disassembling of the wheels of its landing gear, another wheel train of a track consistent with the width of the hauling ramps of said aircraft.

3. Outfit according to claim 2, wherein each longitudinal beam comprises a beam element, an upright and a pair of angle braces secured on said beam element for reinforcing the latter, two forks with a pair of opposite prongs respectively mounted at the ends of said beam element and adapted to straddle the cross members of the landing gear of the helicopter, quick-release fasteners carried by said prongs for permitting a quickly-detachable fixation of said prongs on said cross members, two members secured on the beam element and adapted to receive crank axles adjustable in various positions and to be equipped with wheels, two screwjacks mounted near the ends of said beam element, and anchoring rings mounted on said prongs.

4. Outfit, according to claim 1, wherein the devices for supporting and anchoring the disassembled blades in the aircraft comprise supports adapted to group the disassembled rotor blades of the helicopter, said supports being provided with rings for holding the assembly against movement in the aircraft.

5. Outfit, according to claim 1, wherein the devices for simultaneously holding, protecting, handling and anchoring in the aircraft the disassembled rotor shaft and hub comprise a cover plate to be secured on the lower portion of the disassembled rotor hub of the helicopter for covering and protecting said lower portion and straps carried by said cover plate and adapted to be secured on the outer ends of the rotor blade supporting arms carried by said disassembled rotor hub, a bar for coupling two blade supporting arms and adapted to support the disassembled wheels of the landing gear of the helicopter, and a handling tube detachably secured on said cover plate in order to displace by rolling the disassembled rotor hub provided with said cover plate.

6. Outfit according to claim 5, wherein the coupling bar is formed at its ends with recesses adapted to house the ends of two blade supporting arms of the disassembled rotor hub of the helicopter, said bar further having secured thereto anchoring hooks, fittings and two straps, which straps are adapted to hold the ends of said two blade supporting arms in said recesses, and wherein the cover plate carries a fitting adapted to co-act with the coupling bar fittings with a view to enable the disassembled rotor hub carried by said bar and said plate to bear on the ground.

7. Outfit according to claim 1, wherein the disassembling and reassembling equipment comprises a foldable working bridge having a floor element and means for detachably securing said floor element on the helicopter structure on either side of the helicopter, a hand-actuated foldable slewing crane having a jib inclinable in a vertical plane, means for detachably securing said crane on the helicopter structure, means for manually operating said crane, and means for adjusting the inclination of said jib.

8. Outfit according to claim 7, wherein the means for detachably securing the floor element on the helicopter structure comprises a pair of angle braces pivoted on the floor element, U-shaped members mounted at the ends of said angle braces and adapted to bear on the helicopter structure, quick-release fasteners carried by said floor element for securing the latter on said helicopter structure, and a multiplicity of cross-stays carried by one of the angle braces for constituting a multi-rung access ladder.

9. Outfit according to claim 7, wherein the floor element is coated with a non-skid paint.

10. Outfit according to claim 9, wherein the floor element is made of a plastic material.

11. Outfit according to claim 7, wherein the slewing crane and the means for detachably securing the crane on the helicopter structure, for manually operating the crane and for adjusting the inclination of the jib comprise a king post, a removable footstep bearing carried by the lower end of said king post, clamps carried by said footstep bearing for securing the latter on the helicopter structure, nuts for tightening said clamps, a longitudinal brace and a transverse brace pivotally mounted on an intermediate point of said king post, respectively, pivot pins for anchoring the lower ends of said longitudinal and transverse braces on the helicopter structure, a hand-actuated winch pivotally mounted on the upper end of said king post, a disconnectable winch brace adapted to form a rigid connection between said winch and said king post, a jib pivotally mounted on the upper end of said king post, a tightener inserted between said winch and the outer end of said jib in order to adjust the angular position of the latter, a pulley pivotally mounted on the outer end of said jib, a block, and a rope passing over said winch, said pulley and said block.

12. Outfit according to claim 11, wherein the disassembled transverse brace fits into the disassembled longitudinal brace fitting in turn in the disassembled king post, whereas the winch brace, the winch proper and the jib, after the winch tightener has been disconnected from the winch, are foldable along the king post.

13. An outfit for emplaning into an aircraft a light helicopter of the type having a cabin-forming fuselage above which emerge the rotor shaft and the rotor hub carrying blade supporting arms equipped with detachable blades and, beneath said fuselage, a landing gear having detachable landing skids carrying retractable and detachable wheels, when one at least of the rotor shaft and hub and landing skids projects from the limits of the gage available at the entrance of said aircraft and for simultaneously servicing said helicopter, comprising, in combination, an equipment mountable on the helicopter for disassembling and reassembling whenever required the rotor shaft and hub after the blades have been disassembled, said equipment comprising a foldable working bridge having a floor element and means for detachably securing said floor element on the helicopter structure on either side of the helicopter, a hand-actuated foldable slewing crane having a jib inclinable in a vertical plane, means for detachably securing said crane on the helicopter structure, means for manually operating said crane, and means for adjusting the inclination of said jib; means mountable on the helicopter for disassembling and reassembling whenever required the landing skids after the retractable wheels have been disassembled and for simultaneously handling and anchoring the thus skid-free helicopter in an aircraft the entrance of which has a width less than the distance between the skids equipped with the wheels, said means comprising a pair of longitudinal beams adapted to be dismantled and adjustable in position on the frame of the helicopter landing gear, each one of said longitudinal beams being adapted to be equipped with at least one wheel, whereby it is possible to reconstitute, after the disassembling of the wheels of the landing gear, another wheel train of a track consistent with the width of the hauling ramps of said aircraft; devices for supporting and anchoring the disassembled blades in the aircraft, said devices comprising supports adapted to group the disassembled rotor blades of the helicopter, said supports being provided with rings for holding the assembly against movement in the aircraft; devices for simultaneously holding, protecting, handling and anchoring in the aircraft the disassembled rotor shaft and hub, said devices comprising a cover plate to be secured on the lower portion of the disassembled rotor hub of the helicopter for covering and protecting said lower portion and straps carried by said cover plate and adapted to be secured on the outer ends of the rotor blade supporting arms carried by said disassembled rotor hub, a bar for coupling two blade supporting arms and adapted to support the disassembled wheels of the landing gear of the helicopter, and a handling tube detachably secured on said cover plate in order to displace by rolling the disassembled rotor hub provided with said cover plate; and members readily adaptable on the helicopter for enabling the latter to transport said equipment and devices during its proper flight.

14. Outfit according to claim 13, wherein the members readily adaptable on the helicopter for enabling the latter to transport during its proper flight the equipment and the devices comprise straps carried by one of the longitudinal beams and adapted to secure the coupling bar on said beam, a longitudinal basket secured on the other longitudinal beam, straps carried by said other beam and adapted to secure in said basket the folded hoisting crane, and at least one cloth bag having a plurality of compartments, secured on one of the sides of the helicopter structure and adapted to contain the folded working bridge, the cover plate as well as the other parts necessary to the helicopter emplaning and servicing outfit.

References Cited in the file of this patent

UNITED STATES PATENTS

| | | |
|---|---|---|
| 2,562,490 | Hall | July 31, 1951 |
| 2,738,939 | Johnson | Mar. 20, 1956 |